No. 738,186. PATENTED SEPT. 8, 1903.
H. V. HALLIWELL.
HAIR DRIER.
APPLICATION FILED FEB. 25, 1903.
NO MODEL. 2 SHEETS—SHEET 1.

WITNESSES:
James F. Duhamel
Anthony P. Zoesch

INVENTOR
Henry V. Halliwell
BY
ATTORNEY

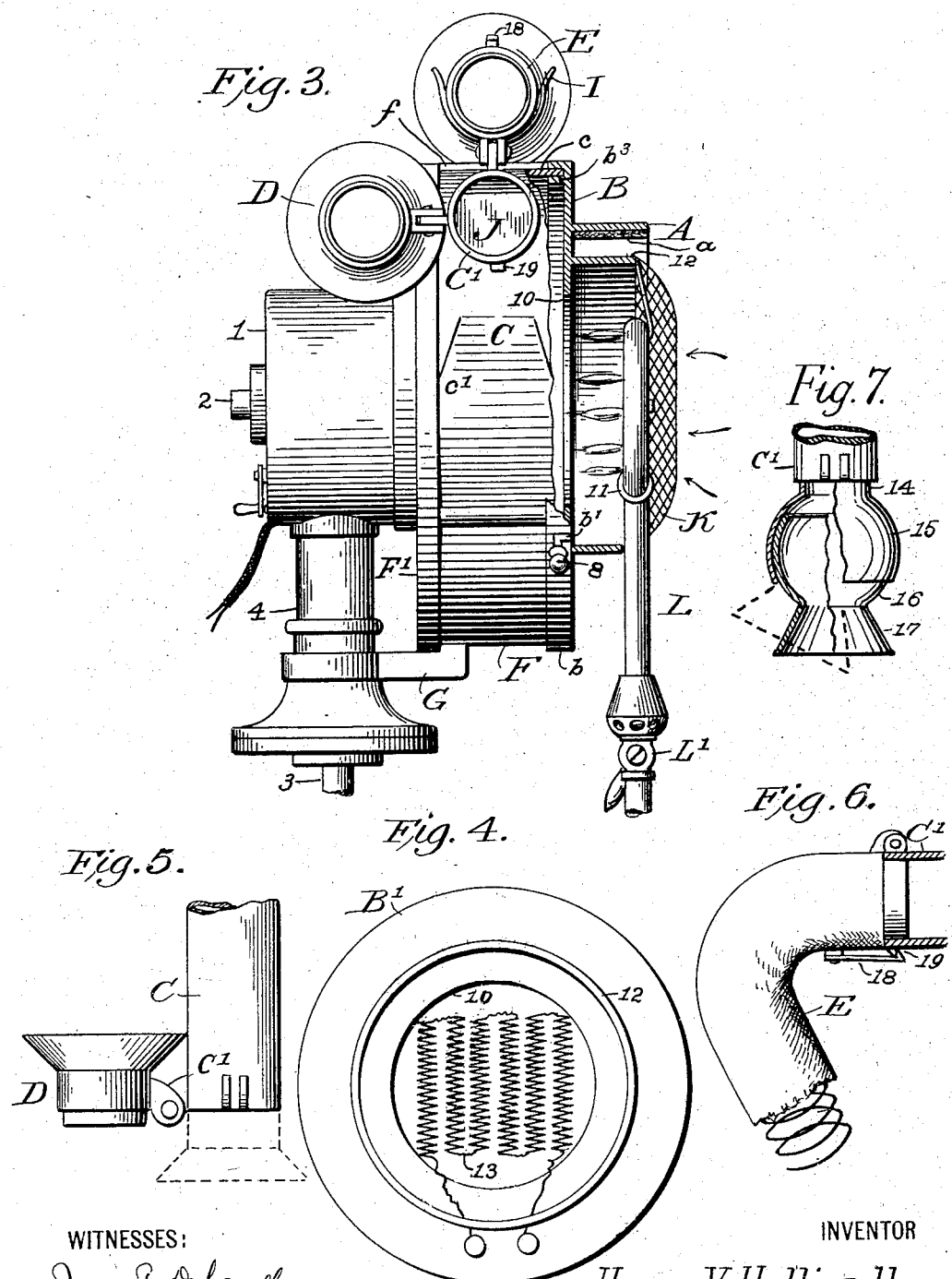

No. 738,186. Patented September 8, 1903.

UNITED STATES PATENT OFFICE.

HENRY V. HALLIWELL, OF NEW YORK, N. Y., ASSIGNOR OF ONE-HALF TO WILLIAM R. SMITH, OF NEW YORK, N. Y.

HAIR-DRIER.

SPECIFICATION forming part of Letters Patent No. 738,186, dated September 8, 1903.

Application filed February 25, 1903. Serial No. 145,001. (No model.)

*To all whom it may concern:*

Be it known that I, HENRY V. HALLIWELL, a citizen of the United States, and a resident of New York city, in the county of New York and State of New York, have invented certain new and useful Improvements in Hair-Driers, of which the following is a specification.

My invention relates to an improvement in hair-drying machines, the objects being to produce a simple device readily taken apart for cleaning or repairs, quickly adjusted, and adapted for cooling or heating atmospheric air, the latter artificially either by gas or electricity, the present invention being an improvement on a hair-drier for which Letters Patent were granted to me on October 19, 1897, No. 591,966.

Figure 1:
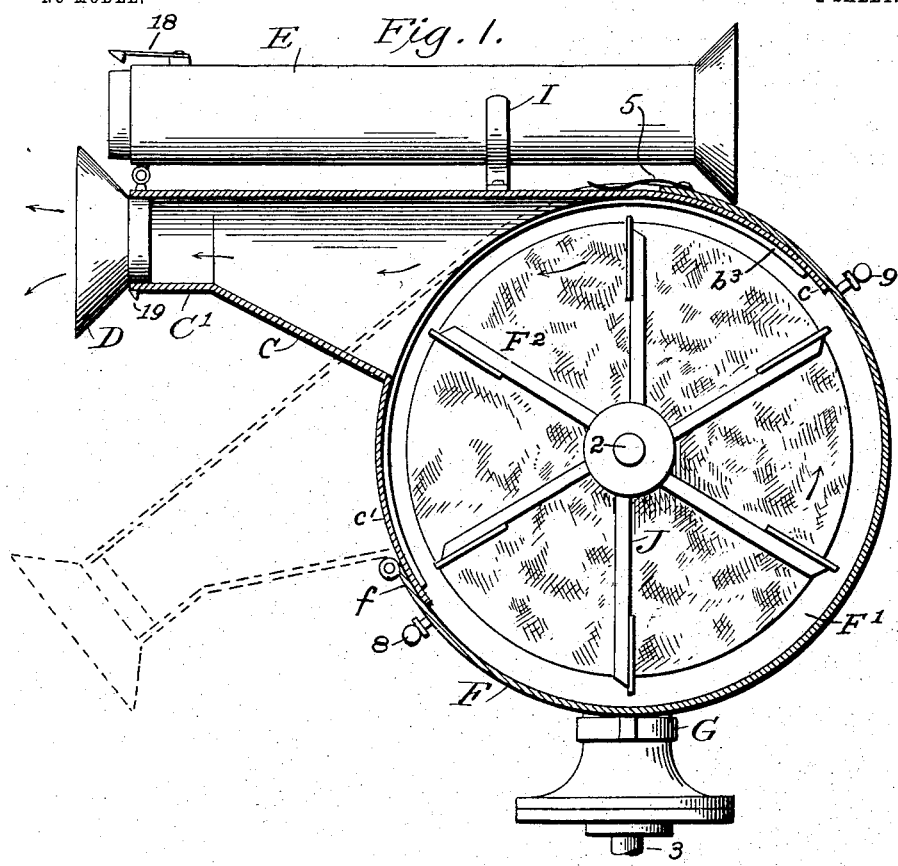
Figure 2:
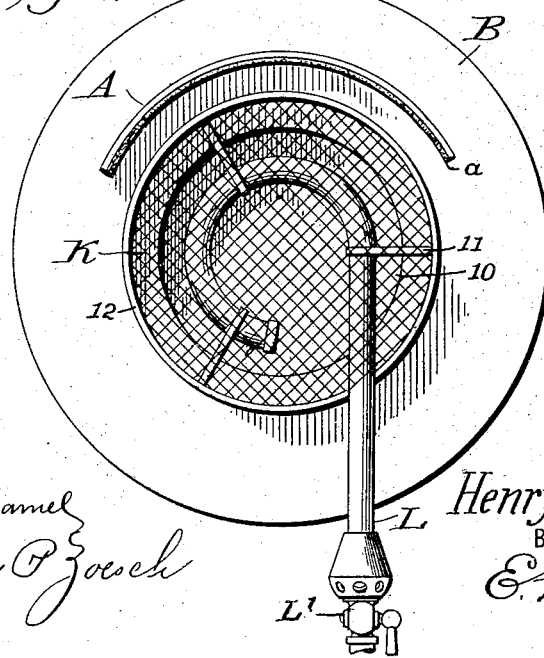

Reference being had to the accompanying drawings, Figure 1 is a front view of my improved machine, partly in section. Fig. 2 is a removable head arranged for gas, this head being adapted to be removably positioned on the drum shown in Fig. 1. Fig. 3 is a side view, partly in section, showing the complete machine adapted for gas. Fig. 4 is a head adapted for heating by the electric current. Fig. 5 is a detail view of a hinged spreader. Fig. 6 is a detail view of a flexible tube and coupling. Fig. 7 is a modified spreader having a ball-and-socket movement.

Similar characters of reference refer to similar parts in the several views.

1 is an electric motor of usual form or construction having a revolving shaft 2, on which I secure a fan J, composed of a number of blades for drawing in and ejecting air in accordance with this invention, such blades being of any preferred shape or size. The motor may be mounted on an adjustable stand, the stem 3 of which is shown. I prefer to use an electric motor mounted on a pillar which permits of a lateral movement, and therefore show my machine attached to a motor of such construction, the motor being rotatively mounted on the pillar 4. The fan J is placed within a drum F, fastened to the motor-case in any preferred manner and steadied thereon by a brace or arm G, encircling the pillar. The inner disk F' of the drum, being that part which is fastened to the motor-case, is lined with sheet-asbestos $F^2$. The peripheral flange $f$ or case of the drum is cut away, say, one-third of its circumference to permit a longitudinal movement of the tapering discharge-tube or projector C, as shown by dotted lines in Fig. 1. This tube is provided with segmental flanges $c$ $c'$, which close the opening or cut-out portion of the flange $f$, as shown in Fig. 1. A flat spring 5 affords a friction to keep the tube C in any desired position, so as to give direction to the air-currents passing through said tube.

C' is a straight neck adapted to receive either the distributers or spreaders (shown in Figs. 6, 7) or the end of the flexible tube E, as will be more fully hereinafter described.

I is a U-shaped bracket to support the flexible tube E when not in use.

8 9 are screw-studs to engage and retain the head B in its place on the drum. This head consists of a disk provided with a narrow flange $b$. Bayonet-slots $b'$ are cut in the flange $b$, as shown, whereby the head is held in place by means of the studs 8 9.

$b^3$ is an inner flange extending only a short distance beyond the opening in the flange of the drum, the flanges $b^2$ and $b^3$ forming a curved channel in which the tube-flanges $c'$ $c^2$ travel.

10 is a large circular opening in the head for the passage of air. 12 is an annular flange some distance away from and around said opening.

L is a Bunsen gas-burner perforated in the ring part facing the drum and supported by a series of arms 11.

L' is a stop-cock.

K is a wire guard.

A is a segmental flange, lined with asbestos $a$ to conserve the heat.

For heating by electricity the air to be drawn into the machine I use a head like B', the construction being substantially as described, except that an electric heater 13 is used instead of the gas-burner, the electricity being taken from the same wires which furnish the current for the motor.

Fig. 5 shows the spreader D swung aside, its position when in use being shown by dotted lines. Instead of using this form of spreader, which is hinged to neck C', I also make use of an adjustable spreader, as shown in Fig. 7. 14 is a neck. 15 is a ball, which may be of spun sheet metal, the neck and ball being fastened together. 16 is a ball, also of spun metal, fitting snugly into ball 15. Both balls are provided with large openings to permit adjustment and for the free passage of the air. 17 is a truncated conoidal shell fastened to the inner ball, as shown, the whole forming the conventional ball-and-socket joint, adapted, however, for a new use and purpose.

Fig. 6 shows the flexible tube E in position. A spring 18 on the latter, acting with a nosing 19, forms a simple means for keeping the two parts locked together when in use.

Such being the construction, the operation is as follows: We will assume that the motor is connected with a source for supplying electric current and the machine fitted up for heating air by gas, the burner being connected by means of a flexible tubing. The gas is turned on and lighted at the ring part, the electric current is turned on the motor, and the fan rotates. The atmospheric air which is drawn in through the wire guard is heated by the Bunsen jets in its passage through the opening 10, being ejected through the tapering tube and in any direction said tube may be placed. If both hands are used by the hair-dresser and it is desired to cover a large area, then either the nozzles shown is Figs. 5 or 7 are inserted in the neck C' and pointed so that the warm air will be thrown in the desired direction. If only one hand is used to manipulate the hair, then the flexible tube E is raised up out of the bracket I, the hinged coupling and lock making a joint at the neck C'. The end of the flexible tube is held in the free hand, and warm air can be applied locally—that is, to top or side of head, to the front or back, or wherever desired. For electrically heating the air the machine is fitted with the front B', having the heating device at or near the drum-opening 10, the wires are connected, and the current is turned on, the operation being substantially as described above. An ordinary rheostat (not shown) enables the operator to obtain more or less heat. The wire guard K is not shown for the sake of clearness in drawings.

By having the machine adjustable on the pillar to give a lateral movement and the tube adjustable to give a longitudinal movement and by using either of the spreaders the operator can place the hair-drier to the side or back of the person whose hair is being treated, and owing to the compactness of the machine in its entirety it occupies very little room. The wire guards and flanges or fenders prevent hair or clothing from being drawn into the machine, and by having the fronts easily removable any dust or short hair accumulating on the fan can be quickly removed.

For cooling the hair it is only necessary to turn off the source of heating means, which gradually cools the metal parts of the machine, the air in consequence also being cool, this latter feature being in all respects similar to my machine described in Patent No. 591,966, to which I have referred.

By lining the drum with asbestos there is no danger of the mechanical parts of the electric motor becoming disarranged by the heat from the Bunsen burner or electric coil, and the motor being exposed to the air it does not get abnormally hot.

Such being a description of my invention, what I claim as new is—

1. In a hair-drying machine, an electric motor provided with a shaft, a drum attached to the case of said electric motor, said drum having openings for the ingress and egress of air, a fan rotatively mounted on the shaft of said motor in said drum, a gas-burner in close proximity to the air-inlet in said drum, and a guard surrounding said burner exteriorly, in combination with a flexible air-tube, detachably mounted on said drum, substantially as described.

2. In a hair-drying machine, an electric motor adapted to be axially mounted on a pillar, a pillar, a drum attached to said motor-casing, a fan within said drum, said drum having openings for the ingress and egress of air, a heating means in close proximity to the ingress-opening in said drum, and a wire guard extending exteriorly over said heating means, substantially as described.

3. In a hair-drying machine, a drum having a flat head adapted to be fastened to an electric motor, a tapered tubular air-projector extending from said drum, a detachable head adapted to be held in position on said drum, said head having an opening for the ingress of air, an annular flange extending outwardly from said head, a heating means secured to said annular flange, and a wire guard extending across said heating means, all combined, substantially as shown.

4. As an article of manufacture, a drum provided with a flat head, lined internally with asbestos, a peripheral flange extending from said head, said flange being provided with an opening extending a short distance along its circumference, a tapered discharge-tube provided with segmental flanges on either sides of said tube, adapted to cover the opening in said peripheral flange, in combination with a removable head having an opening for the ingress of air and means for heating attached to said removable head, substantially as described.

Signed at New York, in the county of New York and State of New York, this 18th day of February, A. D. 1903.

HENRY V. HALLIWELL.

Witnesses:
WILLIAM HOSCHKE,
ANTHONY P. ZOESCH.